United States Patent [19]

Matsuura et al.

[11] Patent Number: 5,311,641
[45] Date of Patent: May 17, 1994

[54] APPARATUS FOR DETERMINING ANY CONTAMINATION OF DUST, ETC., IN A DUCT PRIOR TO CLEANING THE DUCT

[75] Inventors: Kenji Matsuura, Moriyama; Katsumi Toritani, Miki, both of Japan

[73] Assignees: Ataka Construction & Engineering Co., Ltd., Osaka; Kobe Mechatronics Co., Ltd., Kobe, both of Japan

[21] Appl. No.: 967,502

[22] Filed: Oct. 28, 1992

[30] Foreign Application Priority Data

Jul. 27, 1992 [JP] Japan ................... 4-220683

[51] Int. Cl.⁵ .............................. A47L 5/14
[52] U.S. Cl. ........................ 15/406; 15/104.050; 15/316.1
[58] Field of Search ............... 15/104.05, 104.09, 304, 15/316.1, 339, 406, 302; 134/113; 340/825.44, 825.53, 825.72, 825.79

[56] References Cited

U.S. PATENT DOCUMENTS

| | | |
|---|---|---|
| 3,513,443 | 5/1970 | Anderson .................. 340/825.44 |
| 3,646,630 | 3/1972 | Russell ......................... 15/302 |
| 4,244,296 | 1/1981 | Vertut ..................... 15/104.05 |
| 4,578,665 | 3/1986 | Yang ............................ 340/539 |
| 4,986,314 | 1/1991 | Himmler ................. 15/104.09 |
| 5,018,545 | 5/1991 | Wells .......................... 134/113 |
| 5,020,188 | 6/1991 | Walton ........................ 15/406 |
| 5,065,703 | 11/1991 | Lee .......................... 15/316.1 |
| 5,165,434 | 11/1992 | Tobiason ................... 134/113 |

*Primary Examiner*—Philip R. Coe
*Assistant Examiner*—Terrance R. Till
*Attorney, Agent, or Firm*—Edwin E. Greigg; Ronald E. Greigg

[57] ABSTRACT

An in-duct searching apparatus characterized by comprising a traveling truck, a video camera for in-duct observation on board the traveling truck, a singular or plural compressed air ejecting nozzle, and a monitor/-remote-control portion for remotely controlling the traveling truck and the video camera and the compressed air ejecting nozzle; wherein the compressed air ejecting nozzle ejects compressed air toward the alien substances inside the duct which have been observed by the video camera, for grasping their properties.

2 Claims, 4 Drawing Sheets

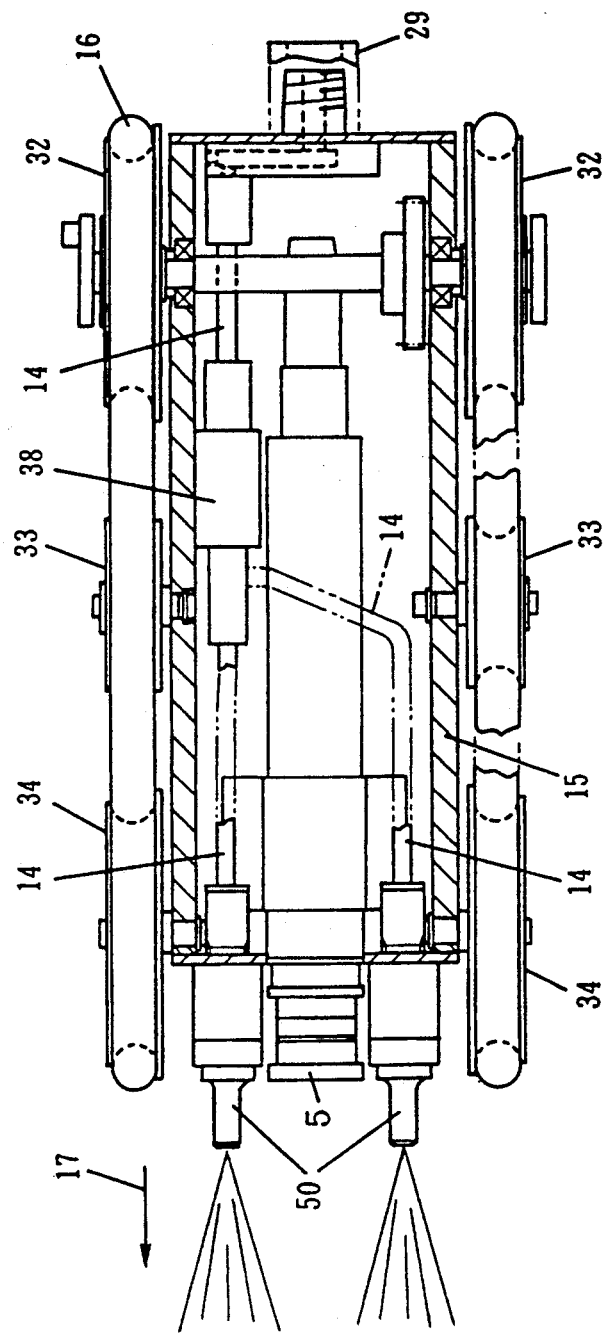

APPARATUS FOR DETERMINING ANY CONTAMINATION OF DUST, ETC., IN A DUCT PRIOR TO CLEANING THE DUCT

COPENDING APPLICATION

This application is copending with application Ser. No. 07/967,500, filed Oct. 28, 1992.

FIELD OF THE INVENTION AND PRIOR ART STATEMENT

1. Field of the Invention

This invention relates to an apparatus for searching and determining the properties of dusts and other alien substances in a duct while traveling inside the duct.

2. Description of the Prior Art

Heretofore, a duct cleaning apparatus has been developed solely for removing the dusts and other alien substances accumulated on and stuck to the inside of a duct. And yet, observing beforehand how the dust and accumulated sticking states of the alien substances in the duct actually are has never been considered.

As a matter of fact, in present day ducts, the type and accumulated sticking states of the dusts and other alien substances accumulating on and sticking to the inside surface inside of the duct are numerous, also there is such a case that very peculiar alien substances are attaching to and accumulating on said surface. Accordingly, it has become indispensable for performing an in-duct cleaning effectively to grasp beforehand, quantitatively as well as qualitatively, such properties of the alien substances as their types and accumulated sticking states inside the duct. However heretofore, operators of an in-duct cleaning apparatus has never attached much importance to such a preparatory searching function as above-mentioned.

OBJECT AND SUMMARY OF THE INVENTION

It is an object of this invention to provide a duct searching apparatus for determining the properties such as the types, accumulated/sticking states and the like of the dusts and other alien substances attached to the inside surface of the duct in advance of an actual duct cleaning operation.

To attain the above object, the duct searching apparatus of the present invention is characterized by comprising a traveling truck, a video camera for duct observation on board said traveling truck, a singular or plural compressed air ejecting nozzle, and a monitor/remote-control portion for remotely controlling said traveling truck and said video camera and said compressed air ejecting nozzle; wherein said compressed air ejecting nozzle ejects compressed air toward the alien substances inside the duct which have been observed by said video camera, for determining their properties.

Said characteristic of the present invention yields an operational effect as follows.

Under the operation of the monitor/remote-control portion, the traveling truck travels inside the duct, and the video camera on board the traveling truck observes the state of the inside of the duct the existence of any remarkable alien substances were perceived inside the duct by said observation, the compressed air is ejected from the compressed air ejecting nozzle on board the traveling truck toward said alien substances. And as a result, such matters as: whether the alien substances are blown off or not; how they are blown off; how the duct inside surface is left after the dust is blown off; and the like are examined. Then on the basis of the above examination; the properties of the alien substances such as their type, accumulated/sticking states, and their relative depth of hardness; and the state of the foundation after the dust has been blown off are exactly determined.

BRIEF DESCRIPTION OF THE DRAWINGS

FIG. 5 is a plan view showing the traveling portion in said preferred embodiment.

DESCRIPTION OF THE PREFERRED EMBODIMENT

The preferred embodiment of the duct searching apparatus of the present invention will be described in accordance with FIG. 1 to FIG. 5.

Figure 1:
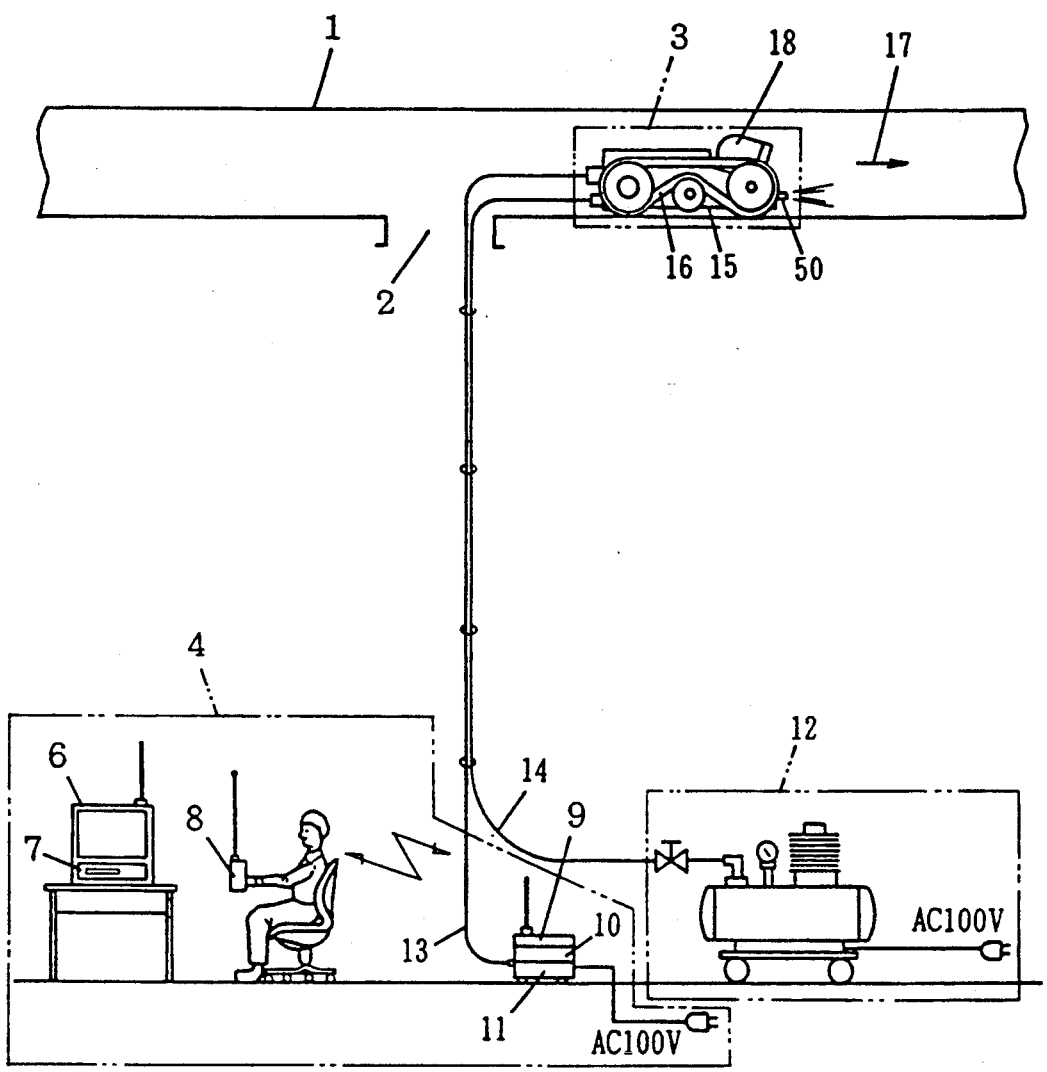
FIG. 1 is an illustrative drawing showing the whole aspect of the preferred embodiment of the present invention.
Figure 2:
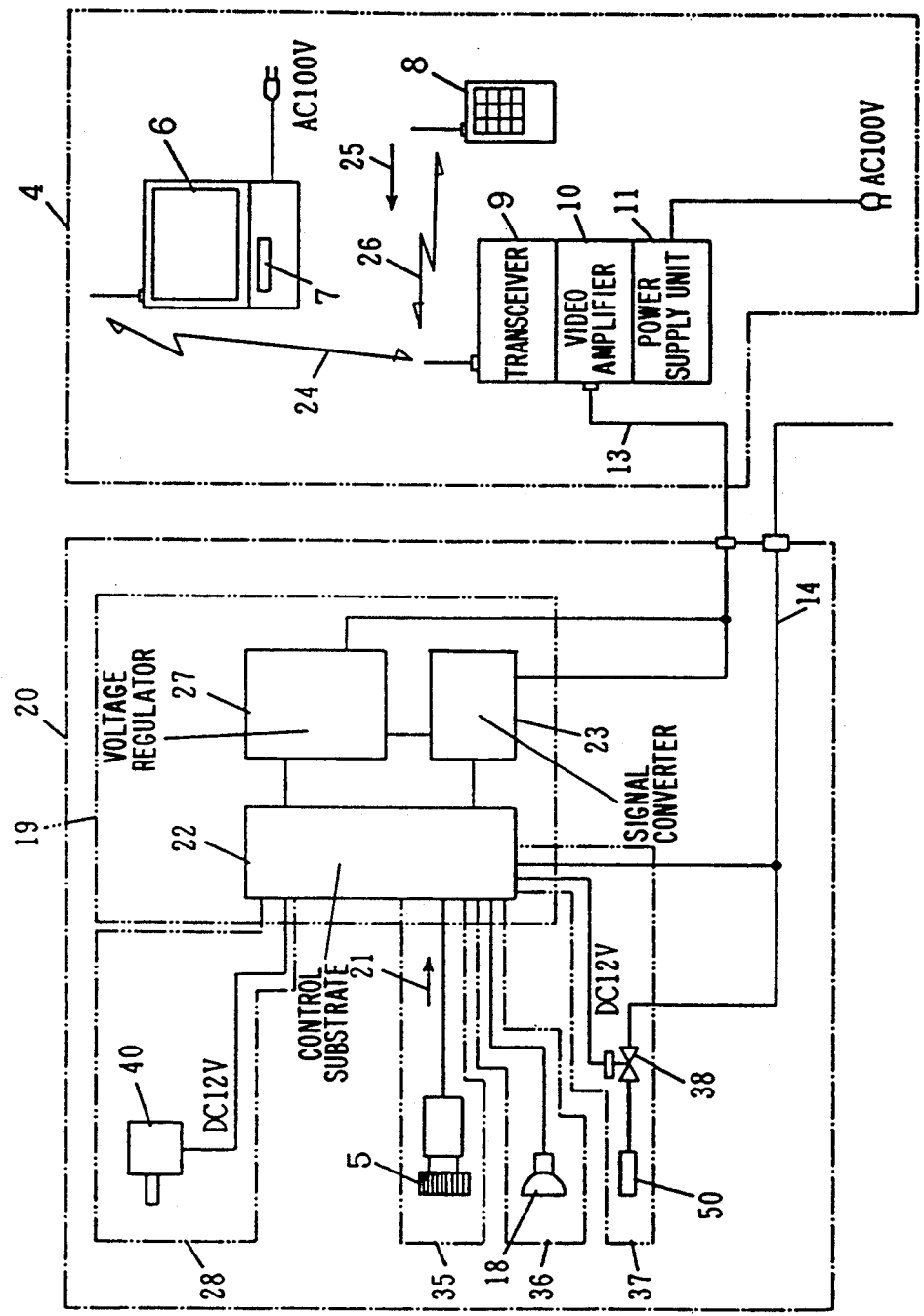
FIG. 2 is a block diagram showing the outline of the traveling portion controller on board a traveling portion and the monitor/remote-control portion remotely connected to said traveling portion controller in said preferred embodiment.
Figure 3:
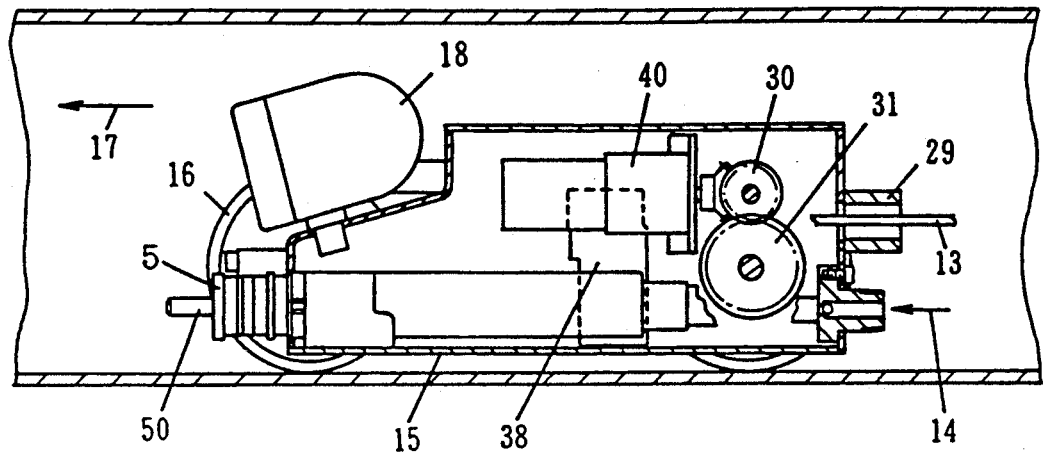
FIG. 3 is a partly cross sectional side view showing the traveling portion in said preferred embodiment.
Figure 4:
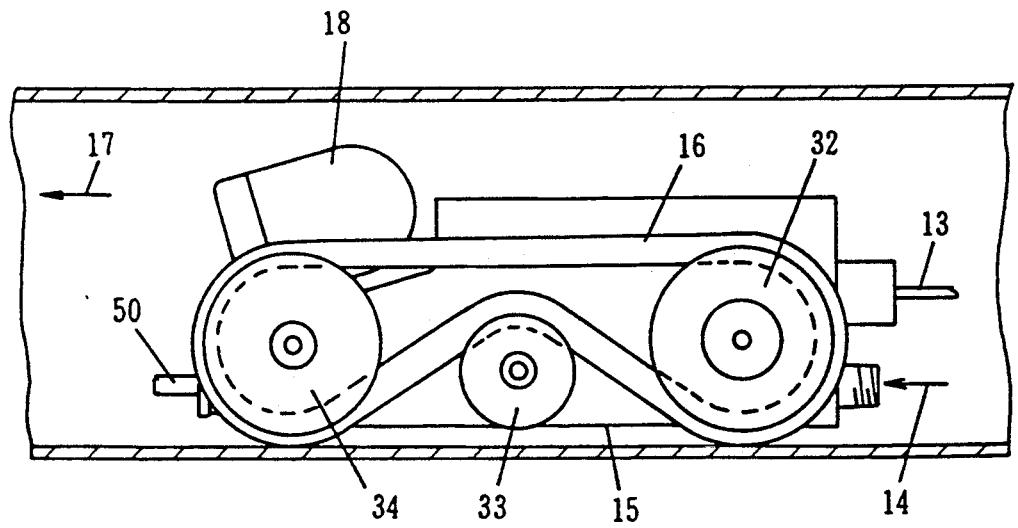
FIG. 4 is an appearance side view showing the traveling portion in said preferred embodiment.

In FIG. 1; 1 is a duct; 2 is an entry of equipment and materials to the duct 1; 3 is a traveling portion carried in through the entry 2. 4 is a monitor/remote-control portion whose first function is to monitor the accumulated state and the like of any dusts and other alien substances inside the duct 1 by the use of a TV 6 and a VTR 7 in accordance with a signal 21 (refer to FIG. 2) given by a video camera 5 (refer to FIG. 5) on board the traveling portion 3 and whose second function is, while the above monitoring if any peculiar looking alien substances or odd looking accumulating states or the like are found, to make a double compressed air ejecting nozzle 50 in the traveling portion 3 operate by the use of a remote-control switch 8 in order to further search the properties such as the kinds and accumulating/sticking states and the like of the alien substances. 9 is a transceiver; 10 is a video amplifier; 11 is a power supply unit supplied with AC-100 V, having a battery built-in to enable itself to work about 5 hours even when said AC-100 V supply is interrupted; 12 is a compressor for generating compressed air; 13 is a connecting line for transmitting the signals sent out from the monitor/remote-control portion 4 to the traveling portion 3 and for transmitting the signal 21 and the like of the video camera 5 sent back from the traveling portion 3 to the monitor/remote-control portion 4; 14 is an air tube for transmitting the compressed air generated by the compressor 12 to the traveling portion 3; 15 is a traveling truck equipped with power transmitting drive belts 16 (refer to FIG. 4 and FIG. 5); 50 is a double compressed air ejecting nozzle (refer to FIG. 3 to FIG. 5); and 17 is a direction in which the traveling portion 3 consisting of the traveling truck 15 and its carrying equipment progresses inside the duct 1.

Further explanation will be given referring to FIG. 2 to FIG. 5. 18 is an illuminating lamp necessary for permitting the video camera 5 to take pictures; 19 is the central part of a traveling portion controller 20.

The TV 6, the VCR 7, the remote-control switch 8, the transceiver 9, the video amplifier 10, the power supply unit 11, and the antenna line 13 in the monitor/remote-control portion 4 connected remotely to the traveling portion controller 20, and said controller 20, have already been described. The Transceiver 9 plays a pivotal role at the side of the monitor/remote-control portion 4 in exchanging signals between the traveling portion controller 20 and the monitor/remote-control portion 4 via said connecting line 13. Said transceiver 9 firstly receives the signal 21 generated by the video camera 5 in the traveling portion controller 20, via a control substrate 22 and a signal converter 23 in the central part 19; secondly, the transceiver transmits the signal 21 to the TV 6 and the VCR 7 in the monitor/remote-control portion 4, via a radio wave line 24 in the same monitor/remote-control portion 4; thirdly, "the scene inside the duct 1 and the scene in front of the traveling portion 3 (including the scene of the state of the alien substances attached to the surface inside the duct 1) viewed by the video camera 5" is changed immediately into the images of the TV 6 and the VCR 7; fourthly, the transceiver receives later-described operating signals 25 which an operator sends out by the use of the remote-control switch 8 in accordance with said images of the TV 6 and the VCR 7, via a radio wave line 26; fifthly, the transceiver transmits said operating signals 25 to the control substrate 22, via the connecting line 13, via a traveling portion electric socket 29 (refer to FIG. 5) and also via the signal converter 23 in the traveling portion controller 20; and thereby, makes said control substrate 22 execute the control of each of the later-described several systems. 27 is a voltage regulator for regulating the voltage to "the electric equipment in each of the later-described several systems", i.e., "each load hanging on the control substrate 22". 28 is a traveling's system comprising a DC-12 V electric motor 40 for driving" driving wheels 32 (refer to FIG. 4 and FIG. 5) "via miter gears 30 and a gear 31 and also for driving" driven wheels 34 (refer to FIG. 4 and FIG. 5) "via guide rollers 33 (refer to FIG. 4 and FIG. 5) for propelling the traveling truck 15; 35 is a video camera system comprising the video camera 5; 36 is an illuminating lamp system comprising a DC-6 V illuminating lamp 18 (refer to FIG. 4); 37 is a compressed air ejecting system comprising the double compressed air ejecting nozzle 50 for ejecting the compressed air transmitted through the air tube 14 via a DC-12 V electromagnetic valve 38 (refer to FIG. 5). Further it should be added that; when the aforementioned remote-control switch 8 is used, several operating signals 25 to effect the following can be sent out: putting on or off the control substrate 22; making the traveling truck 15 turn left or right, or go ahead or backward, or stop; putting on or off the video camera 5; turning on or off the illuminating lamp 18; and making the double compressed air ejecting nozzle 50 start or stop the ejection of the compressed air by opening or closing the electromagnetic valve 38.

Said video camera 5 is located on the central part of the forefront of the traveling truck 15, for monitoring the in-duct place in front of the truck 15.

Besides, said double compressed air ejecting nozzle 50 is located on both sides of the video camera 5, and is fixed so that it may eject the compressed air toward the duct inside surface in oblique lower front of the traveling truck 15. As a matter of course, the nozzle 50 may be made such that its ejecting direction can be remotely controlled to point upward, downward, leftward and rightward by the use of the monitor/remote-control portion 4.

Further, said illuminating lamp 18 is located on the upper part of the forefront of the traveling truck 15 for directing illuminating light toward the inside of duct in an oblique lower front of the traveling truck 15. As a matter of course, the illuminating lamp 18 also may be made such that its illuminating direction can be remotely controlled by the use of the monitor/remote-control portion 4.

In this embodiment; while the traveling portion 3 is traveling inside the duct 1 under the control of (the remote control switch 8 of) the monitor/remote-control portion 4, the video camera 5 keeps observing of the inside of the duct 1 assisted by the illuminating lamp 18, similarly under the control of the monitor/remote-control portion 4. And in case the existence of any remarkable alien substances and their accumulated/sticking states and the like were ensured on the images of the TV 6 and VCR 7 in the monitor/remote-control portion 4 based on the signal 21 from the video camera 5; as the occasion demands, the traveling truck 15 is made to advance to the appropriate place close to said alien substances, and the double compressed air ejecting nozzle 50 is made to eject the compressed air toward said alien substances. The change in a state of said alien substances caused by the ejection of the compressed air is viewed by the video camera and made into the images of said TV 6 and VCR 7. And thereby; the various properties such as the types, accumulating state and relative hardness degree of the dust and other alien substances inside the ducts 1; and the state of foundation after the dust is blown off are clarified. Accordingly, by utilizing the data of the TV 6 and VCR 7 indicating the properties of said alien substances, it is possible to carry out the duct cleaning process of the next stage effectively.

In carrying out the above; the present invention is utilized for the preparatory test of the next stage of a duct cleaning process, i.e., the preparatory test to search the properties to determine the type and accumulated/sticking states of the dust and other alien substances inside the duct 1. In addition to that, the present invention can be utilized for ensuring the effect of cleaning brought about by the duct cleaning process whose execution has just been completed.

The duct searching apparatus of the present invention comprises the aforementioned structure, brings about the aforementioned operational effect, and consequently yields an overall effect as follows.

By means of the video camera on board the traveling truck, the state inside the duct can be observed, and besides, by means of the compressed air ejected by the compressed air ejecting nozzle, the properties such as the types and accumulated/sticking states and the like of the dust and other alien substances inside the duct can be determined. Accordingly, by the use of this preparatory data, the kind and class of duct cleaning apparatus to be used can be selected in accordance with an actual duct state, and thereby, the duct cleaning process of the next stage can be effectively performed.

What is claimed is:

1. An apparatus for searching for any contamination of an inside surface of a duct, comprising:
   a traveling truck (3);
   a driving means for driving said traveling truck forwardly and backwardly in an interior of said duct (1) whose inside contamination is to be investigated;

a monitor video camera (5) positioned on said traveling truck (3) for monitoring an inside view of said duct (1);

a remote monitor image display means (6) for displaying an image taken by said monitor video camera;

a transceiver (9) for transmitting radio signals from and to said remote monitor image display means and via a connecting line (13) from and to said video camera;

at least one compressed air ejecting nozzle (50) provided on a forward end of said traveling truck for ejecting compressed air toward inside surfaces of said duct firstly to permit an examination by said video camera whether any dust has accumulated on said inside surfaces of said duct and is capable of being blown off by said compressed air, and secondly to expose the inside surfaces of said duct for viewing by said video camera by blowing off said dust;

an air compressor for supplying compressed air to said at least one compressed-air ejecting nozzle via an air transmission tube (14);

an electromagnetic control valve in said air transmission tube for controlling the compressed air supplied to said compressed-air ejecting nozzle;

an electronic circuit connected with said transceiver for controlling said driving means, said monitor video camera and said electromagnetic control valve, a remote control for controlling said remote monitor image display means and said transceiver;

whereby the inside contamination of said duct is made clear both by determining if any dust accumulated inside the duct is capable of being blown off and by observing underlying contamination appearing on the inner surfaces of the duct if the accumulated dust has been blown off.

2. An apparatus as set forth in claim 1, in which a light is provided on said travel truck and directed in a viewing direction of said video camera.

* * * * *